United States Patent

[11] 3,618,707

[72] Inventor Clyde A. Sluhan
 Perrysburg, Ohio
[21] Appl. No. 46,743
[22] Filed June 16, 1970
[45] Patented Nov. 9, 1971
[73] Assignee Metal Chemicals Incorporated
 Perrysburg, Ohio

[54] METHOD OF LUBRICATING MACHINE TOOLS
 4 Claims, 1 Drawing Fig.
[52] U.S. Cl. .................................................... 184/1 E,
 72/42, 83/170, 184/6.14
[51] Int. Cl. .................................................... F01m 9/02
[50] Field of Search ........................................ 184/1 E,
 614; 90/11 C, 11 B; 51/267–412; 83/170, 169;
 72/42

[56] References Cited
 FOREIGN PATENTS
 341,242 1/1931 Great Britain ................ 184/6 K

*Primary Examiner*—William E. Wayner
*Attorney*—Marshall & Yeasting

ABSTRACT: In the operation of at least one machine tool having at least one cutting tool, at least one spindle and at least one slide, a fluid lubricant is fed to the spindle and to the slide. This fluid lubricant is a water-emulsifiable composition consisting essentially of a mineral oil together with an emulsifying agent capable of causing the mineral oil to form a stable emulsion with water. At the same time, there is fed to the cutting tool an aqueous emulsion consisting essentially of water, a mineral oil and an emulsifying agent that maintains the emulsion stable. The overflow or leakage of the fluid lubricant is mingled with the overflow of the aqueous emulsion, and the commingled fluids are collected. Then solids are removed from the commingled fluids to regenerate a clean aqueous emulsion, and the composition of the regenerated aqueous emulsion is adjusted by adding ingredients thereto, to bring the regenerated aqueous emulsion to substantially the same composition as the aqueous emulsion initially fed to the cutting tool, and the regenerated aqueous emulsion is recirculated to the cutting tool.

PATENTED NOV 9 1971        3,618,707
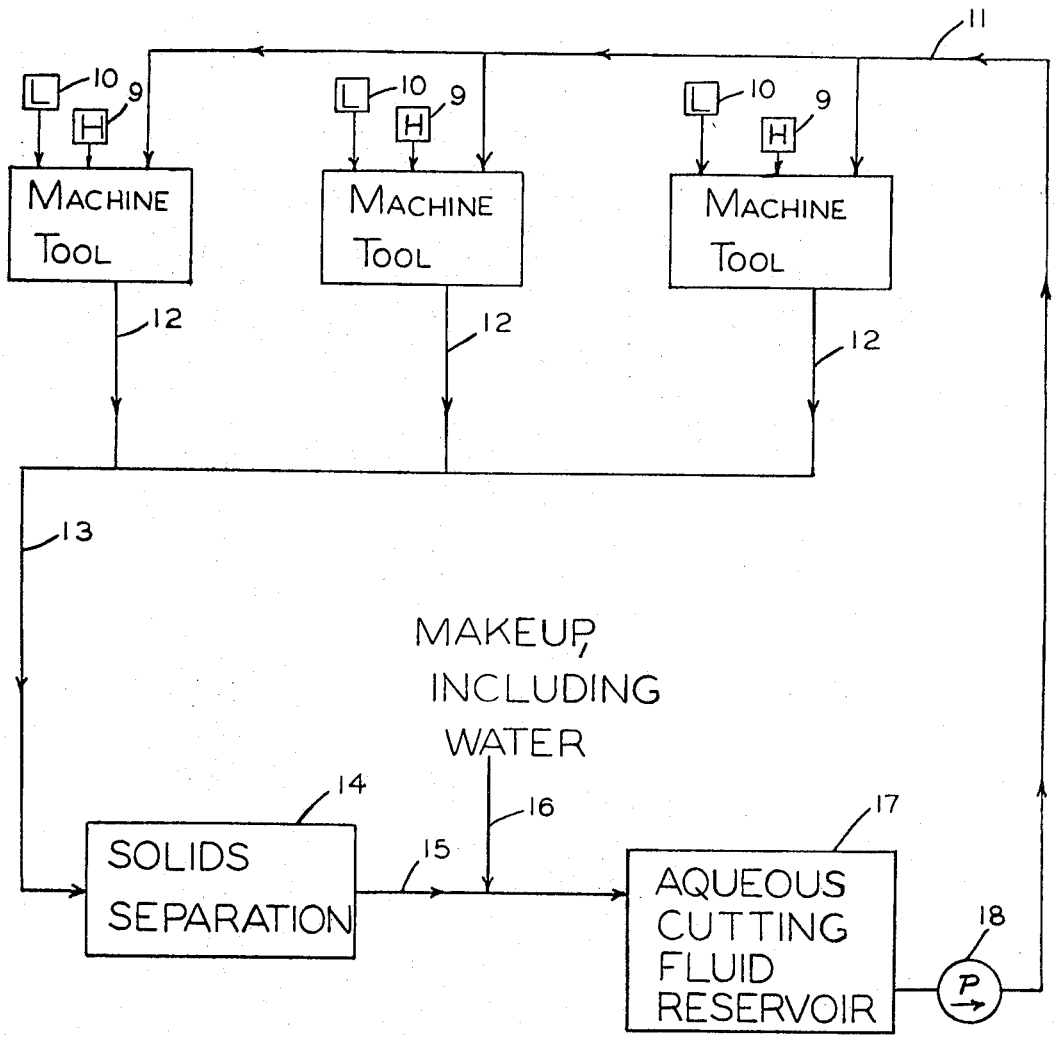
INVENTOR.
CLYDE A. SLUHAN
BY
Marshall & Yeasting
Attorneys

METHOD OF LUBRICATING MACHINE TOOLS

BACKGROUND OF THE INVENTION

Aqueous cutting and grinding fluids are used in large quantities for lubricating and cooling the cutting tools employed in machining operations such as drilling, boring, milling, honing and grinding operations. In a plant that contains a number of machine tools, a central system may be provided to supply the cutting or grinding fluid to all of the machines and to collect the overflow of the fluid from the machines. The collected overflow of cutting or grinding fluid, upon being returned to the central system, is treated to remove solids, and is stored in a reservoir from which it is pumped back to the cutting tools which are to be lubricated and cooled.

The function of a cutting or grinding fluid is to lubricate the cutting tool, to act as a coolant, and to flush away chips and other debris in order to keep the work relatively clean. In order to perform these functions, it is necessary to supply a relatively large flow of cutting fluid to each machine. Thus in a large plant the total amount of cutting fluid in the system at any one time may be as many as several hundred thousand gallons.

The moving parts of a machine tool other than the cutting tool, such as spindles, slides and gears, must be lubricated constantly while the machine tool is in operation, although the flow of lubricant required for the lubrication of such parts is much smaller than the flow of cutting fluid required by the machine tool. For lubricating moving parts of a machine tool such as spindles, slides, gears and screws, it is customary to employ a water-insoluble fluid lubricant, usually a mineral oil. It has been found that the water-insoluble lubricants which are used for lubricating the moving parts of a machine tool other than the cutting tool gradually leak into the aqueous cutting fluid during the operation of a machine tool, so that the water-insoluble lubricant is carried into the central system and thus contaminates the aqueous cutting fluid. As the aqueous cutting fluid in a plant is used over and over, the concentration of water-insoluble lubricant gradually increases as the lubricant used for lubricating the moving parts other than the cutting tools continues to leak into the aqueous cutting fluid. It has been found that part of the water-insoluble lubricant floats to the top of the aqueous cutting fluid so that it can be skimmed off. A centrifuge will remove even more of the water-insoluble lubricant, but part of the insoluble lubricant becomes mixed into the aqueous fluid as an emulsion and is very difficult to remove.

The contamination of aqueous cutting fluids by water-insoluble lubricants used for lubricating various moving parts of machine tools has created a serious problem for many years.

This contamination changes the properties of the aqueous cutting fluid so as to increase its viscosity and, most importantly, to reduce its efficiency as a coolant. The insoluble oil phase preferentially absorbs those ingredients in the aqueous cutting fluid which are more oil soluble, so as to change the composition of the aqueous cutting fluid and to disrupt the performance of the surfactants. The insoluble oil which accumulates in the aqueous cutting fluid as a contaminant may cause excessive foaming of the cutting fluid during the metal working operation. Eventually the concentration of water-insoluble lubricants in the aqueous cutting fluid attains such a level that the aqueous cutting fluid becomes rancid or will no longer function properly.

Because of the difficulties which are caused by contamination of aqueous cutting fluids with water-insoluble lubricants, various installations have been constructed for removal of such contaminants. One such installation which has been employed consists of a large settling tank in which part of the water-insoluble oils gradually separate to form a layer upon the surface of the aqueous fluid in the tank. However, water-insoluble lubricants which have become emulsified with the aqueous cutting fluid cannot be separated in this manner.

Even when attempts have been made to separate contaminating water-insoluble lubricants from aqueous cutting fluids, the difficulties caused by such contaminants have persisted, resulting in progressive deterioration of the aqueous cutting fluids, including degeneration by bacterial growth. Thus in a large plant it is often necessary to discard several hundred thousand gallons of aqueous cutting fluid prematurely because of contamination with water-insoluble lubricants. Such premature discarding of the aqueous cutting fluid not only entails substantial expense for the cost of a fresh supply of the fluid, but also requires that the plant be shutdown for a substantial period of time for emptying, cleaning and refilling the system. Moreover, the discarding of a large volume of degenerated aqueous cutting fluid, contaminated with water-insoluble lubricants, creates a serious waste disposal or stream pollution problem.

SUMMARY OF THE INVENTION

It is an object of the present invention to eliminate the difficulties that have arisen from contamination of aqueous cutting fluids with water-insoluble lubricants in the operation of machine tools.

The present method of lubricating machine tools provides a system in which the various fluids or lubricants are so chosen and so handled that the aqueous cutting fluid does not become contaminated. Instead, the aqueous cutting fluid absorbs the fluid lubricants which are used for lubricating moving parts other than the cutting tool, so that these fluid lubricants become an integral and functional part of the aqueous cutting fluid. Since the fluid lubricants which are used to lubricate moving parts other than the cutting tool become a part of the aqueous cutting fluid in the practice of the present invention, the aqueous cutting fluid then can be reused and recycled indefinitely without any necessity for separating foreign lubricants therefrom.

In accordance with the present method, there is fed to the spindles and slides of a machine tool a fluid lubricant that is a water-emulsifiable composition consisting essentially of a mineral oil together with an emulsifying agent capable of causing the mineral oil to form a stable emulsion with water. At the same time, the aqueous cutting fluid that is fed to the cutting tool is an aqueous emulsion consisting essentially of water, a mineral oil and an emulsifying agent that maintains the emulsion stable. The fluid lubricant used in the practice of the present invention becomes commingled with this aqueous emulsion, as overflow of the fluid lubricant and overflow of the aqueous emulsion occur during the operation of the machine tool. Since the fluid lubricant is a water-emulsifiable composition, consisting essentially of a mineral oil and an emulsifying agent, the fluid lubricant which overflows in the operation of the machine tool becomes emulsified with the aqueous cutting fluid, which is already in the form of an aqueous emulsion, so that the overflow of the fluid lubricant does not contaminate the aqueous cutting fluid, but becomes a part of the aqueous cutting fluid.

Thus in the practice of the invention, a regenerated aqueous emulsion is recovered by removing solids from the commingled fluids which overflow from the machine tool. The composition of this regenerated aqueous emulsion is adjusted, for example by adding deionized water to compensate for the increase in the concentration of the emulsion which is caused by the addition of the overflow of the fluid lubricant. By such adjustment of the composition of the regenerated aqueous emulsion, its composition is brought to substantially the same composition as the aqueous emulsion initially fed to the cutting tool, so that the regenerated aqueous emulsion of adjusted composition can be recirculated to the cutting tool in the operation of the system.

BRIEF DESCRIPTION OF THE DRAWING

The drawing is a flow diagram illustrating the method of the present invention.

DESCRIPTION OF THE PREFERRED EMBODIMENTS

The fluid lubricants used for lubricating the spindles and slides of the machine tools in the practice of the present invention differ from the fluid lubricants heretofore used for such purposes, in that the fluid lubricants used in the present method are water-emulsifiable compositions rather than water-insoluble oils. One advantage of the water-insoluble oils heretofore used for lubricating the spindles and slides of machine tools is that the mineral oils commonly used are excellent corrosion-preventive agents. However, any water that enters a reservoir containing a water-insoluble lubricant will not dissolve therein, but will separate in a "pocket," where it may cause severe localized corrosion or wear. Since the fluid lubricant used in the practice of the present invention is a water-emulsifiable composition, any water which enters the lubricating system will be miscible with the fluid lubricant therein and will not produce localized corrosion because it will not separate from the fluid lubricant.

COMPOSITION OF FLUID LUBRICANT

A fluid lubricant used in the practice of the present invention is a water-emulsifiable composition consisting essentially of a mineral oil together with an emulsifying agent capable of causing the mineral oil to form a stable emulsion with water.

The mineral oil in the present fluid lubricant may be any mineral oil, such as a suitable petroleum fraction, which provides a fluid lubricant of the desired viscosity and lubricating properties. Usually the mineral oil constitutes from 40 to 80 percent by weight of the fluid lubricant.

In the preferred embodiment of the present method, the composition of the fluid lubricant which is fed to the spindle and to the slide of the machine tool is substantially identical to the composition of the aqueous emulsion that is fed to the cutting tool, except for a difference in water content. Water is the major component of the aqueous emulsion which is fed to the cutting tool, while the water content of the fluid lubricant is usually very small in order that the fluid lubricant may have a high viscosity and satisfactory lubricating properties.

In the preferred embodiment of the present method, since the composition of the fluid lubricant and the composition of the aqueous cutting fluid are substantially identical except for their water content, leakage of the overflow of the fluid lubricant into the overflow of the aqueous cutting fluid in the operation of a machine tool does not change the composition of the aqueous cutting fluid in any way except to lower its water content. Thus after the commingled overflows of the fluid lubricant and the aqueous cutting fluid have been collected and solids have been removed therefrom to regenerate an aqueous emulsion, it is only necessary to add water to the regenerated aqueous emulsion in order to bring its composition to substantially the same composition as that of the aqueous cutting fluid which was initially fed to the cutting tool. This regenerated aqueous emulsion, to which water has been added to restore it to its original composition, is then recirculated to the cutting tool and reused as a cutting fluid.

In the operation of this preferred embodiment of the present method, the composition of the aqueous cutting fluid which is fed to the cutting tool remains constant, and the only ingredient which needs to be added to adjust the composition of the recirculated aqueous cutting fluid is water. Preferably the water added at this point is deionized water, in order to avoid introduction of corrosive salts and impurities into the system.

The addition of water to restore the regenerated aqueous cutting fluid to its initial composition also compensates for loss of water from the system by evaporation.

The solid materials, such as chips, which are removed from the commingled overflows of the fluid lubricant and the aqueous cutting fluid, are wet and thus carry some of the fluid out of the system. This loss of fluid in removing the solid materials tends to compensate for the gradual increase in the total volume of aqueous cutting fluid in the system which is caused by leakage of the fluid lubricant into the aqueous cutting fluid. However, in the preferred embodiment of the present method, the rate at which ingredients of the aqueous cutting fluid are lost in removing the solid materials from the system may be greater than the rate at which the ingredients are replenished by the overflow or leakage of the fluid lubricant into the aqueous cutting fluid. If that is the case, it will be necessary to introduce a small supplemental flow of the fluid lubricant into the regenerated aqueous cutting fluid, and to increase the amount of added water correspondingly, in order to maintain the desired total volume of aqueous cutting fluid in the system.

In this preferred embodiment of the method, the fluid lubricant will contain some ingredients which are desired in the aqueous cutting fluid, but which ordinarily would not be necessary in a fluid lubricant. Such ingredients are used in the fluid lubricant in the preferred embodiment of the method in order that the composition of the fluid lubricant may be identical with that of the aqueous cutting fluid, except for the water content.

The fluid lubricant used in the practice of the present invention may contain not only an emulsifying agent but also other additives such as corrosion inhibitors. Some of the additives that are incorporated in the fluid lubricant are in the form of water solutions. Usually the only water present in the fluid lubricant is the water which is incorporated incidentally in adding ingredients which are in the form of aqueous solutions.

Preferably the emulsifying agent used in the practice of the invention is a combination of substances such as anionic and nonionic surfactants. A typical emulsifying agent consists of a combination of a sodium petroleum sulfonate, a sodium or potassium oleate and a nonionic surfactant. The concentration of each of these three ingredients in the fluid lubricant may be from 2 to 15 percent, but usually is not more than 10 percent and preferably approximately 5 percent. The preferred nonionic surfactants are condensation products of ethylene oxide with derivatives of fatty acids such as alcohols, amides or amines.

Since the present fluid lubricant, unlike the insoluble lubricants heretofore used, may have an appreciable water content, it tends to be corrosive so that it is desirable to incorporate one or more corrosion inhibitors. The corrosion inhibitors incorporated in the fluid lubricant may be any of the known corrosion inhibitors, such as organic phosphates, organic phosphonates and organic phosphites. Usually the total amount of such corrosion inhibitors is less than 5 percent of the weight of the fluid lubricant.

Another desirable ingredient in the fluid lubricant is about 1 percent of an alkaline buffer, such as ethanolamine, diethanolamine or triethanolamine, which prevents the development of acidity that would destroy the anionic surfactants.

In the preferred embodiment of the present method, in which the composition of the fluid lubricant is the same as the composition of the aqueous cutting fluid except for the water content, the fluid lubricant contains certain other ingredients which are desirable in the aqueous cutting fluid. One such ingredient is an additive that gives extreme pressure properties, which may constitute from 10 to 30 percent and often constitutes from 15 to 20 percent of the fluid lubricant. Such an additive may be a chlorinated paraffin, a sulfurized olefin, or a phosphorus compound.

Another ingredient which is desirable for use in the preferred embodiment of the method because it is useful in the aqueous cutting fluid consists in a silicone antifoam agent, which may be present in an amount approximating 0.1 percent of the fluid lubricant.

HYDRAULIC FLUIDS

In those machine tools in which hydraulic cylinders are used to operate the slides, leakage of the hydraulic fluid into the overflow of the aqueous cutting fluid occurs. When hydraulic cylinders are used to operate the slides, the hydraulic fluid, like the fluid lubricant employed, should be such that it is absorbed into the aqueous cutting fluid without contaminating the cutting fluid.

Thus the hydraulic fluid, like the fluid lubricant employed, should contain a mineral oil together with an emulsifying agent capable of causing the mineral oil to form a stable emulsion with water. Usually it is desirable that the viscosity of the hydraulic fluid be substantially less than the viscosity of the fluid lubricant, and the hydraulic fluid may be compounded to provide a lower viscosity through use of a lower viscosity mineral oil or selection of other ingredients, or alternatively it may be emulsified in water to provide a fluid, noncorrosive hydraulic medium.

In the preferred embodiment of the present method, the hydraulic fluid, the fluid lubricant and the aqueous cutting fluid fed to the machine tool are all of the same composition, except for their water content, the fluid lubricant usually having the smallest water content and the aqueous cutting fluid having the greatest water content of the three fluids.

The ingredients, other than water, of the hydraulic fluid may be the ingredients which have been enumerated in the foregoing discussion of the fluid lubricant.

AQUEOUS CUTTING OR GRINDING FLUID

The ingredients used in the aqueous cutting or grinding fluid also have been described in the foregoing discussion of the fluid lubricant that is used in the preferred embodiment of the present method, which has the same composition as the aqueous cutting or grinding fluid except for its water content.

The water content of the aqueous emulsion which is used as the cutting or grinding fluid in the practice of the invention may be from 80 to 98 percent, but usually is between 90 and 95 percent.

OPERATION

The present method may be used advantageously in performing the machining operations upon steel, brass, aluminum, copper, zinc and galvanized iron. These metals give better results than case iron in the present method, because these metals when machined produce chips and other debris which do not contain graphite and therefore are easy to separate from the aqueous emulsion.

In the practice of the present method, the hydraulic system of at least one machine tool is supplied with a hydraulic fluid under pressure from a reservoir 9. At the same time, a lubricant is fed from a reservoir 10 to the moving parts of each machine tool, other than the cutting tools, such as spindles, slides, screws and gears. The lubricant is fed from each reservoir 10 by gravity flow or by means of a metering pump, at the proper rate to keep the various moving parts of the machine tool adequately lubricated.

Both the hydraulic fluid and the lubricant are water-emulsifiable compositions, each consisting essentially of a mineral oil together with an emulsifying agent capable of causing the mineral oil to form a stable emulsion with water. The water content of the fluid lubricant preferably is very small, but the hydraulic fluid may contain a substantial proportion of water in order to decrease its viscosity, as hereinbefore described.

An aqueous cutting or grinding fluid is supplied to the cutting tool of each machine tool from a supply main 11. Preferably the aqueous cutting fluid, the hydraulic fluid and the lubricant are all of the same composition, except for a difference in water content, as hereinbefore described.

The overflow of the cutting or grinding fluid at each machine tool is collected in a suitable sump, and the leakage of the hydraulic fluid together with the overflow of the lubricant from the spindles and slides also enters the same sump, where it mingles with the overflow of the aqueous cutting or grinding fluid. From the sump of each machine tool, a discharge line 12 leads to a common discharge main 13.

The common discharge main 13 in turn leads to solids separation apparatus 14, which is conventional in construction and may include filters, magnetic separators and centrifuges for separating the solids such as chips from machining operations and abrasives from grinding operations.

The fluid recovered in the solids separation apparatus flows through a return line 15 to which is connected a water supply line 16. Usually the water content of the fluid entering the return line 15 is less than the water content of the aqueous cutting or grinding fluid supplied from the main 11, because of loss of water by evaporation, and because of leakage or overflow of the hydraulic fluid and the lubricant, which contain less water than the aqueous cutting or grinding fluid and thus reduce the average water content of the fluids entering the discharge lines 12. Accordingly, the water content of the fluid entering the return line 15 is measured, and sufficient water is introduced to the water supply line 16 to dilute the fluid in the return line 15 to the extent necessary to restore the water content to a value equal to the water content of the aqueous cutting or grinding fluid initially supplied to the machines. Preferably the water introduced through the water supply line 16 is deionized water, which does not introduce any impurities into the system.

In the preferred embodiment of the present method, in which the lubricant, the hydraulic fluid and the aqueous cutting or grinding fluid are all of the same composition, except for a difference in water content, the only ingredient which needs to be added through the supply line 16 is water. However, if the losses of fluid in solids separation are greater than the gain that is due to leakage of lubricant and hydraulic fluid into the system, it may be necessary to add aqueous cutting fluid to the system from time to time to maintain the desired total volume of fluid in the system.

If the operation of the process is not in accordance with the preferred embodiment, in that the lubricant and the hydraulic fluid lack some of the ingredients which are present in the aqueous cutting fluid, then it will be necessary to add such ingredients along with the water through the supply line 16, in order to bring the composition of the regenerated aqueous emulsion to substantially the same composition as the aqueous emulsion initially fed to the cutting tools.

The regenerated aqueous emulsion, after adjustment of its composition by the addition made through the supply line 16, enters the storage reservoir 17.

The storage reservoir 17 is filled with a supply of aqueous cutting or grinding fluid of the desired composition at the beginning of the operation, and the composition of the regenerated aqueous emulsion entering the reservoir 17 should be substantially the same as the composition of the aqueous emulsion with which the reservoir 17 is initially filled. A pump 18 recirculates the aqueous emulsion from the reservoir 17 back to the cutting tools.

EXAMPLE 1

A lubricating fluid for use in the practice of the present method is prepared by intimately mixing the following ingredients in the parts by weight shown:

| | |
|---|---|
| sodium petroleum sulfonate (Petronate HL) | 9.9 |
| oleic acid | 2.8 |
| 45% aqueous potassium hydroxide solution | 0.4 |
| diethylene glycol | 1.6 |
| water | 1.0 |
| mineral oil (Midcontinent Pale No. 100) | 84.3 |

A composition so prepared may be diluted with 10 volumes of water for use as a hydraulic fluid, or may be diluted with 15 volumes of water for use as a general purpose cutting fluid.

EXAMPLE 2

A fluid lubricant for use in the present method was prepared by mixing the following ingredients in parts by weight:

| | |
|---|---|
| sodium petroleum sulfonate | 9.0 |
| oleic acid | 4.0 |
| 45% potassium hydroxide solution | 3.0 |
| Midcontinent Pale No. 100 mineral oil | 72.1 |
| butyl carbitol | 2.0 |
| 50% aqueous rosin oil solution | 9.4 |
| phenol | 0.5 |

This composition may be diluted with 10 volumes of water to produce a hydraulic fluid, or with 15 volumes of water to produce an aqueous cutting fluid.

EXAMPLE 3

The following parts by weight of the named ingredients were intimately mixed to produce a fluid lubricant for use in the present method:

| | |
|---|---|
| sodium petroleum sulfonate | 10 |
| 45% sodium hydroxide solution | 0.3 |
| diethylene glycol | 1.2 |
| water | 1.0 |
| Midcontinent Pale No. 100 mineral oil | 84 |
| 50% rosin oil solution | 3.5 |

EXAMPLE 4

The following parts by weight of the ingredients listed were intimately mixed to produce a fluid lubricant for use under severe conditions in the present method:

| | |
|---|---|
| sodium petroleum sulfonate | 8.2 |
| 45% potassium hydroxide solution | 3.44 |
| Midcontinent Pale No. 100 mineral oil | 54 |
| 50% rosin oil solution | 32.36 |
| phenol | 2.0 |

EXAMPLE 5

A fluid lubricant for use in the present method is prepared by intimately mixing the following parts per weight of the ingredients listed:

| | |
|---|---|
| sodium petroleum sulfonate | 20 |
| tall oil | 6.5 |
| 50% solution of rosin oil | 14 |
| 45% solution of potassium hydroxide | 5.8 |
| water | 3.8 |
| 99% isopropyl alcohol | 4.0 |
| 85% phosphoric acid solution | 0.4 |
| Midcontinent Pale No. 100 mineral oil | 45.5 |

Dilution of this lubricant with about 15 volumes of water produces an aqueous emulsion that is useful in an aqueous grinding fluid because it is relatively transparent so that it does not obscure the work, and permits the grinding machine operator to observe the grinding operation.

I claim:

1. A method of lubricating at least one machine tool having at least one cutting tool, at least one spindle and at least one slide, comprising the steps of (a) feeding to such spindle and to such slide a fluid lubricant that is a water-emulsifiable composition consisting essentially of a mineral oil together with an emulsifying agent capable of causing the mineral oil to form a stable emulsion with water, (b) feeding to such cutting tool an aqueous emulsion consisting essentially of water, a mineral oil and an emulsifying agent that maintains the emulsion stable, (c) mingling the overflow of the fluid lubricant with the overflow of the aqueous emulsion, (d) collecting the commingled fluids, (e) removing solids from the commingled fluids to regenerate an aqueous emulsion, (f) adjusting the composition of the regenerated aqueous emulsion by adding ingredients thereto to bring the regenerated aqueous emulsion to substantially the same composition as the aqueous emulsion initially fed to the cutting tool, and (g) recirculating the regenerated aqueous emulsion to the cutting tool.

2. A method according to claim 1 wherein the fluid lubricant and aqueous emulsion are fed simultaneously to a plurality of machine tools.

3. A method according to claim 1 wherein the aqueous emulsion fed to the cutting tool is an aqueous emulsion of a composition that is substantially the same as the fluid lubricant fed to the spindle and to the slide, and deionized water is added to the regenerated aqueous emulsion to bring it to substantially the same composition as the aqueous emulsion initially fed to the cutting tool.

4. A method according to claim 1 wherein a hydraulic fluid that comprises a mineral oil together with an emulsifying agent that causes the mineral oil to form a stable emulsion with water is supplied to a hydraulic system in the machine tool.

* * * * *